Dec. 10, 1940.  O. WULFERT  2,224,465

FLEXIBLE COUPLING

Filed June 3, 1939

INVENTOR
OTTO WULFERT
BY
ATTORNEY

Patented Dec. 10, 1940

2,224,465

UNITED STATES PATENT OFFICE 2,224,465

FLEXIBLE COUPLING

Otto Wulfert, St. Louis, Mo., assignor to Wagner Electric Corporation, St. Louis, Mo., a corporation of Delaware Application June 3, 1939, Serial No. 277,188

3 Claims. (Cl. 64—14)

The object of my invention is to provide a coupling between a driving and a driven shaft which will have sufficient flexibility to compensate for slight errors in alignment of the shafts but which will have considerable rigidity and be noiseless in operation. While my coupling may be used for various purposes, it is particularly adapted for connecting the driving shafts of small motors to driven units.

In carrying out my invention I provide the driving and driven shafts with a pair of telescoping members which are connected but held out of contact with each other by a core of elastic material, such as rubber, which is vulcanized or otherwise adhesively secured to both members.

Figure 1:
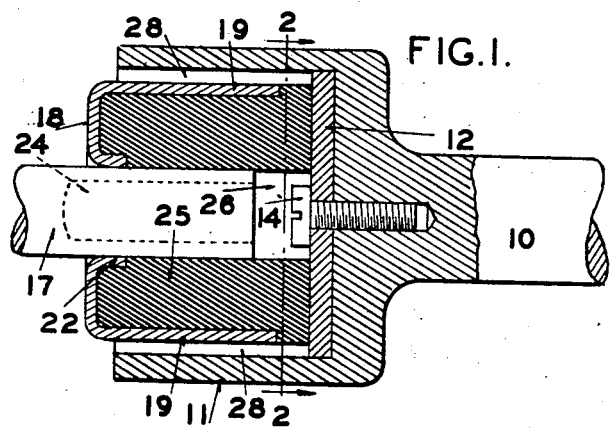
Figure 2:
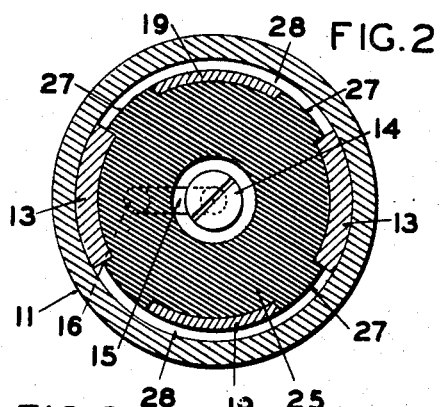
Figure 4:
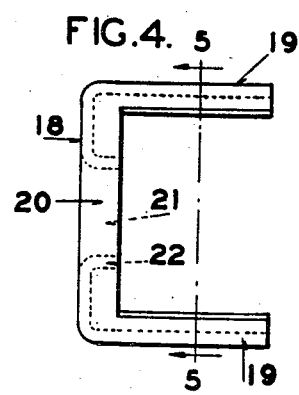
Figure 3:
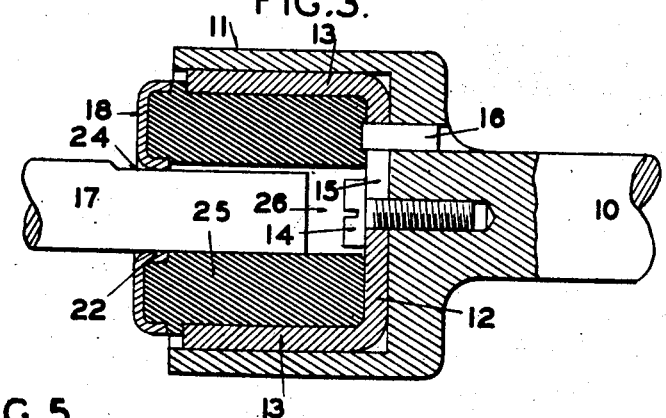
Figure 5:
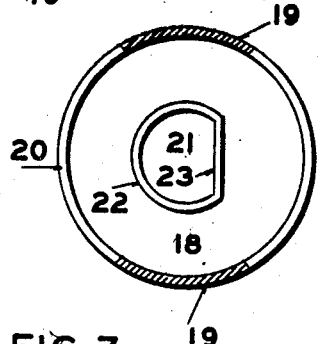
Figure 6:
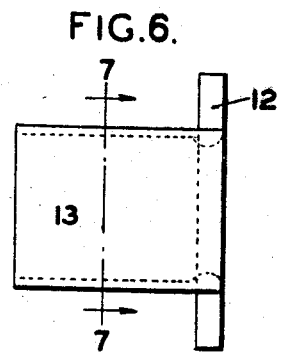
Figure 7:
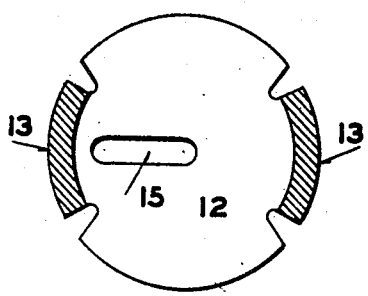

In the accompanying drawing, which illustrates one form of coupling made in accordance with my invention, Figure 1 is a longitudinal section; Figure 2 is a cross section taken on the line 2—2 of Figure 1; Figure 3 is a longitudinal view at right angles to Figure 1; Figure 4 is a side elevation of the member carried on the driven shaft; Figure 5 is a section taken on the line 5—5 of Figure 4; Figure 6 is a side elevation of the member carried on the driving shaft; and Figure 7 is a section taken on the line 7—7 of Figure 6.

The driving shaft 10 carries a tubular holder 11 which may be formed integral therewith. Positioned in the holder is a telescoping member consisting of a disc 12 and two arms 13. These arms are preferably formed by bending over extensions of the disc and are shaped to fit snugly within the holder. The member is held in position by a screw 14 passing through a slot 15 in the disc and threaded into shaft 10. Rotation of the member relative to the shaft is prevented by a pin 16 entering slot 15.

The telescoping member carried by the driven shaft 17 is similar in form to that of the member above described and is preferably made of drawn material. In forming it, metal of less thickness than that forming the member on the driving shaft is drawn to produce a cylinder having a closed end which provides the end plate 18 of the driven member. Two sections of the cylinder wall are cut away to provide arms 19 to extend between arms 13 of the driving member. The cut-away portions do not, however, extend completely to the end plate 18 but terminate a sufficient distance therefrom to provide a reinforcing flange 20. An opening 21 is formed in the end plate 18 for the reception of shaft 17 and the metal around this opening is struck up to form a hub 22. The opening 21 should be non-circular in form to prevent relative rotation between the member and the shaft. This is conveniently accomplished by forming the opening with a flat side 23 cooperating with a correspondingly flattened portion 24 of the shaft.

The two telescoping members are secured together by a core 25 of elastic material, such as rubber, adhesively secured to both members, preferably by vulcanizing. Rubber of the synthetic variety is preferably employed when the device may be liable to contact with oil. The core is provided with a central opening 26 for the shaft 17 and is preferably provided with longitudinally extending ribs 27 (Figure 2) extending between the edges of the arms 13 and 19. The use of thinner metal in arms 19 than in arms 13 permits the use of a core cylindrical in form and at the same time secures the necessary clearance space 28 to permit of lateral compensating movement between the parts.

Having fully described my invention, what I claim as new and desire to secure by Letters Patent of the United States is:

1. In a device of the class described, the combination with driving and driven shafts, of a bifurcated member carried by one of said shafts, a second bifurcated member carried by the other of said shafts and having its arms positioned between but out of contact with the arms of said first named member, a cylindrical connector of elastic material having its periphery adhesively connected to the inner faces of the arms of both said members, said connector having a central opening to receive one of the shafts, said last named shaft having sliding but non-rotary engagement with one of the members.

2. In a device of the class described, the combination with driving and driven shafts, of a tubular holder carried by one of said shafts, a bifurcated member secured in said holder and its arms in contact with the wall thereof, a second bifurcated member sliding but non-rotatably carried by the other shaft, said latter named member having its arms positioned between but out of contact with the arms of the first named member, the arms of the second named member being spaced from the wall of the holder, and a cylindrical connector of elastic material having its periphery adhesively connected to both said members.

3. In a device of the class described, the combination with driving and driven shafts, of a tubular holder carried by one of said shafts, a bifurcated member secured in said holder and its arms in contact with the wall thereof, an end plate member, a pair of arms carried by said end plate member and positioned between but out of contact with the arms of said bifurcated member and being spaced from the wall of the holder, a reenforcing flange for the end plate member extending beteween the arms thereof, said end plate member having a non-circular opening for the reception of the other of the shafts, and a cylindrical connector of elastic material having its periphery adhesively connected to both members, said connector having a central opening for the reception of the last named shaft.

OTTO WULFERT.